(12) United States Patent
Bataineh et al.

(10) Patent No.: US 7,532,645 B1
(45) Date of Patent: May 12, 2009

(54) RECEIVER OPERABLE TO RECEIVE DATA AT A LOWER DATA RATE

(75) Inventors: Khaldoun Bataineh, Austin, TX (US); Stephen D. Anderson, Minnetonka, MN (US); Michael Maas, Mendota Heights, MN (US); David E. Tetzlaff, Minnetonka, MN (US)

(73) Assignee: Xilinx, Inc., San Jose, CA (US)

( * ) Notice: Subject to any disclaimer, the term of this patent is extended or adjusted under 35 U.S.C. 154(b) by 603 days.

(21) Appl. No.: 11/035,613

(22) Filed: Jan. 14, 2005

(51) Int. Cl.
 *H04J 3/07* (2006.01)
(52) U.S. Cl. ............... 370/503; 370/509; 375/316; 375/355; 375/376; 375/374; 375/375
(58) Field of Classification Search .......... 375/376, 375/374, 375, 327, 316, 355; 370/503, 509
See application file for complete search history.

(56) References Cited

U.S. PATENT DOCUMENTS

| 4,280,224 A | * | 7/1981 | Chethik ............ 375/368 |
| 4,933,959 A | * | 6/1990 | Knechtel ........... 375/376 |
| 6,128,680 A | * | 10/2000 | Sallee ............. 710/66 |
| 6,711,221 B1 | | 3/2004 | Belotserkovsky et al. |
| 7,089,444 B1 | | 8/2006 | Asaduzzaman et al. |
| 7,167,534 B2 | | 1/2007 | Nakamura |
| 7,197,098 B2 | | 3/2007 | Johnson |
| 7,257,183 B2 | * | 8/2007 | Dally et al. ........ 375/376 |
| 2003/0190006 A1 | * | 10/2003 | Nagano ............ 375/376 |
| 2006/0062327 A1 | * | 3/2006 | Dally ............. 375/316 |

OTHER PUBLICATIONS

U.S. Appl. No. 10/771,210, filed Feb. 3, 2004, Huang.
U.S. Appl. No. 10/930,579, filed Aug. 31, 2004, Chuang et al.
Sawyer, Nick, "Data Recovery," Application Note XAPP224 (v2.3), Mar. 4, 2004, pp. 1-7, available from Xilinx, Inc., 2100 Logic Drive, San Jose CA 95124.

* cited by examiner

*Primary Examiner*—Chi H Pham
*Assistant Examiner*—David Oveissi
(74) *Attorney, Agent, or Firm*—Timothy W. Markison; Michael T. Wallace

(57) ABSTRACT

A receiver that includes: an oversampling module that converts a serial stream of data into a plurality of streams of oversampled data based on the receive clock; a transition location module that determines transition locations of the streams of oversampled data and the receive clock; a pointer adjust module that determines a pointer variable based on the transition locations and the receive clock; a data selection module that determines an equivalent data value for the streams of oversampled data based on the pointer variable; a staging register module that produces an offset data word and an extra data word from the equivalent data value for the oversampled data streams; and a output register module that produces a parallel data output from at least one of the offset data word and the extra data word.

22 Claims, 12 Drawing Sheets receiving device 14 receiving device 14

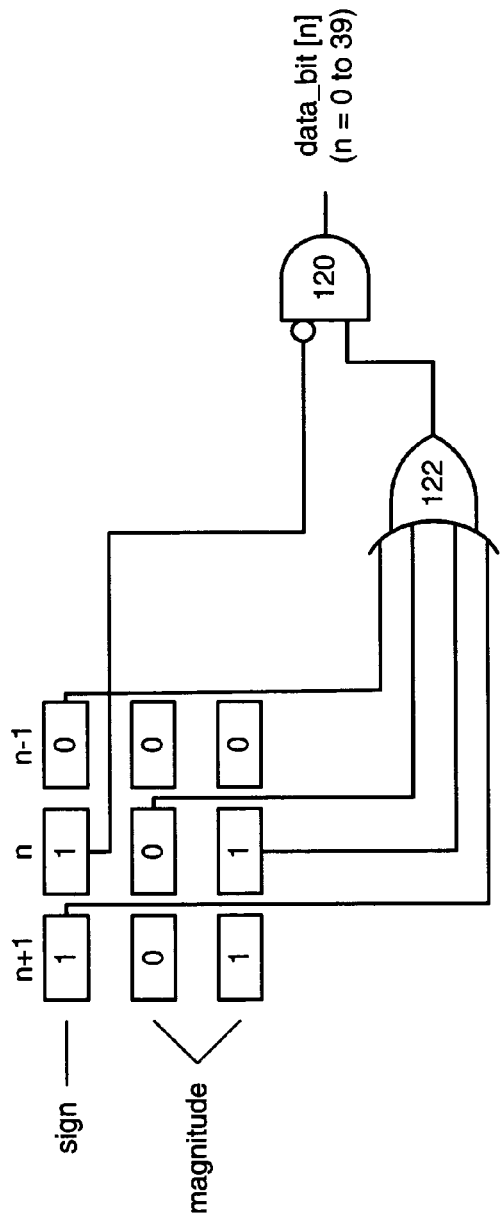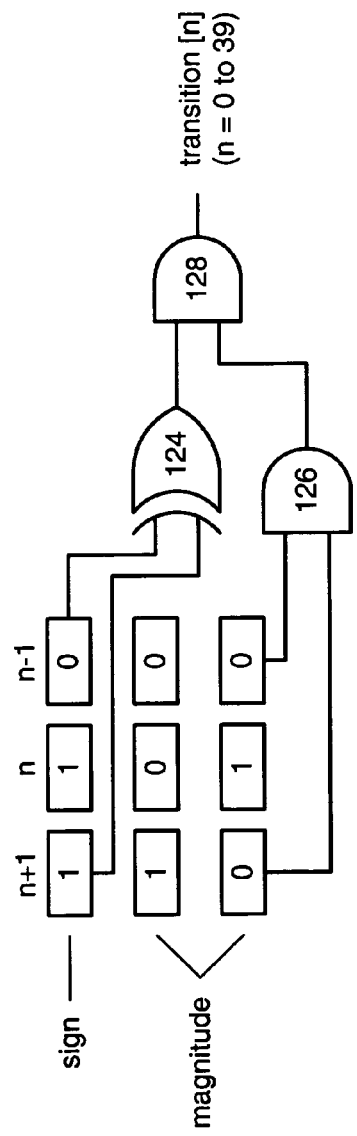
FIG. 7
FIG. 8 transition location module 78 data selection module 72 staging register module 74 output register module 76

RECEIVER OPERABLE TO RECEIVE DATA AT A LOWER DATA RATE

BACKGROUND OF THE INVENTION

1. Technical Field of the Invention

This invention relates generally to data communications and more particularly to data communications via devices operating at different rates.

2. Description of Related Art

As is known, a receiver is operable to detect binary data received via a serial data bus and to convert the data from a higher speed serial form to a lower speed parallel form such that it can be further processed and/or manipulated at lower speeds. For example, a receiver might detect and convert 16 bits of incoming serial data at 10 gigabits-per-second (Gbps) to a 16-bit parallel word having a rate of $1/16^{th}$ of 10 GHz.

As is also known, one type of receiver includes a clock and data recovery (CDR) stage followed by a shift register. The CDR functions to recover a clock signal and the data from the incoming serial data. In particular, the CDR includes an oscillator that locks to the incoming bit stream such that it produces the recovered clock having a frequency equal to the rate of the incoming serial data. The recovered clock is then used to detect, and hence recover, each bit of the incoming serial data. As each bit is detected, it is clocked into the shift register. When the shift register contains a next full data word (e.g., a parallel data word), the receiver outputs the parallel data word.

As is further known, a CDR will generally operate in two modes: a startup mode and a normal mode. In the startup mode, the oscillator of the CDR produces a fixed clock that is a multiple of a stable reference clock. The rate of the fixed clock is equal to (with some tolerance) the rate of the incoming serial data, but is not synchronous with the clocking of the incoming stream of data. The CDR is in this mode when the receiver is enabled and/or anytime synchronization between the recovered clock and the clocking of the incoming data is lost. The CDR enters the normal mode when synchronization between the recovered clock and the clocking of the incoming serial data is achieved.

Typically, to effectively recover high speed serial data (e.g., greater than 1 Gbps), a CDR is implemented using analog components due to the oscillator. In particular, to produce a clock having a very high adjustable frequency, analog oscillators are currently the practical choice for a one sample per bit receiver. While analog oscillators are the oscillators of choice, their maximum rate and/or bandwidth is limited by the particular semiconductor process and circuit used to implement the receiver.

As is even further known, a receiver is often required to detect multiple serial data rates. One approach to solving this issue is to use the analog form of a one sample per bit receiver, but vary the CDR so that it is able to track the desired serial rates. But this variation includes problems associated with changing analog circuits. For example, to get different operating frequencies different circuit elements must be switched in and out of the circuit. This becomes very complex if a large number of different oscillator frequencies are targeted with a wide range bandwidth. Further, component values needed at the lowest data rates may be physically large rendering them impractical for use with an integrated circuit, and most oscillators become nonlinear if used at a frequency that is much less than its designed center frequency.

An issue with receivers implemented in the analog domain is drift. As is known, depending on the type of encoding, the serial data stream will typically have regions where there are no transitions from one signal level to the other. This is a well known problem for analog CDRs that require frequent transitions to accurately track the stream of data. If too long of time passes without a transition, the oscillator of the CDR can drift away from the correct phase. As such, the CDR may lose synchronization with the incoming data stream. By keeping the CDR in the startup mode where it referencing the local clock, this drift caused by the source can be reduce, thus leaving drift that is caused by the allowed transmit and receive clocks tolerance.

Another issue with such receivers is received signal impairments where a received signal includes noise and/or distortion caused by the channel, such as inter-symbol interference. In general, this is a high frequency form of distortion that shifts the transitions in the received signal producing jitter. The receiver must remain synchronized to the incoming data stream and perform low pass filtering to reject the high frequency jitter.

Another issue for such receivers is high speed circuit implementations on integrated circuits. For instance, in many data communication/signal processing functions, there is a trade-off between processing sequentially at high speeds versus spatially at lower speeds. Often the lower speed choice results in a net power reduction and the ability to use known circuit implementations that have more reliable results.

Therefore, a need exists for a receiver that is operable to receive data at lower data rates while minimizing the adverse affects of drift, received signal impairments and achieves a desired balance with high speed circuit considerations.

BRIEF SUMMARY OF THE INVENTION

The receiver operable to receive data at a lower data rate of the present invention substantially meets these needs and others. In one embodiment, a method for receiving data at a lower data rate begins by receiving a stream of data having the lower data rate, wherein the lower data rate corresponds to a transmit clock. The method continues by sampling the stream of data based on a free running sampling point to produce an oversampled stream of data, wherein the sampling point is based on a receive clock and extracted transitions of the stream of data, wherein rate of the receive clock is multiples greater than a rate of the transmit clock and wherein the receive clock is asynchronous with the transmit clock. The method continues by determining drift of a recovering point with respect to the receive clock. The method continues by comparing the drift of the recovering point with a drift threshold. The method continues by, when the drift of the recovering point compares unfavorably with the drift threshold, adjusting at least one cycle of a data output clock based on the receive clock to produce an adjusted output data clock, wherein the rate of the receive clock is an oversampling rate greater than a rate of the output data clock. The method continue by recovering data from the oversampled stream of data and the data output clock and the adjusted output data clock to produce recovered data based on the receive clock and the drift of the recovering point.

In another embodiment, a receiver operable to receive data at a lower data rate than a rate of a receive clock includes an oversampling module, a transition location module, a pointer adjust module, a data selection module, a staging register module, and an output register module. The oversampling module is operably coupled to convert a serial stream of data into a plurality of streams of oversampled data based on the receive clock, wherein the serial stream of data is at the lower data rate, wherein the lower data rate corresponds to a transmit clock. The transition location module is operably coupled to determine transition locations of the plurality of streams of oversampled data and the receive clock. The pointer adjust module is operably coupled to determine a pointer variable based on the transition locations and the receive clock. The data selection module is operably coupled to determine an equivalent data value for each of the plurality of streams of oversampled data based on the pointer variable. The staging register module is operably coupled to produce an offset data word and an extra data word from the equivalent data value for each of the plurality of oversampled data streams. The output register module is operably coupled to produce a parallel data output from at least one of the offset data word and the extra data word.

BRIEF DESCRIPTION OF THE SEVERAL VIEWS OF THE DRAWINGS

FIG. 7 is a schematic block diagram of a circuit for determining data values in accordance with the present invention;

FIG. 8 is a schematic block diagram for determining data transitions in accordance with the present invention;

DETAILED DESCRIPTION OF THE INVENTION

Figure 1:
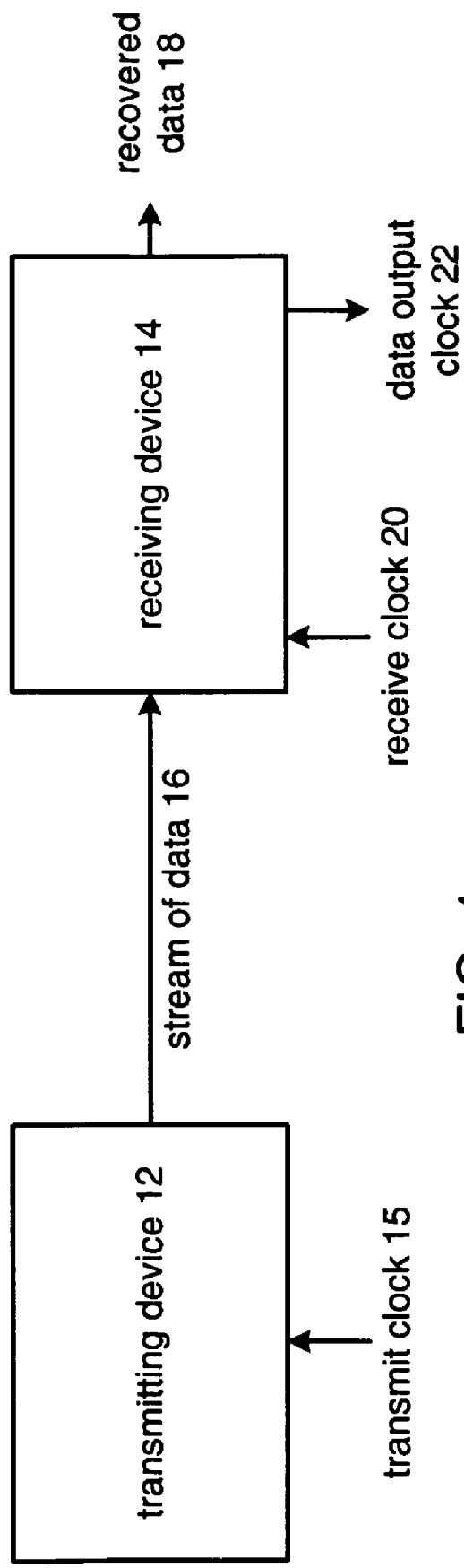
FIG. 1 is a schematic block diagram of a data communication in accordance with the present invention.

FIG. 1 is a schematic block diagram of a communication between a transmitting device 12 and a receiving device 14. The transmitting device 12 outputs a stream of data 16 based on a transmit clock 15. The stream of data 16 may be a serial bit stream of data and/or parallel streams of serial data. The encoding of the data within the stream of data 16 may be binary encoded and/or any other form of encoding for serial data transmissions.

The receiving device 14 receives the stream of data 16 based on a receive clock 20. In this embodiment, the receive clock 20 is at a rate that is greater than the transmit clock 15 and, since the clocks 15 and 20 are independently generated, they are asynchronous. For example, the transmit clock 15 may correspond to a data rate of 1.25 gigabits-per-second (Gbps) or 2.5 gigabits-per-second while the receive clock corresponds to a 10 gigabits-per-second rate. In an 8× and 4× architecture embodiment, the receive clock 20 is a 5 GHz clock for a 10 Gbps data rate and the transmit clock 15 is a 625 MHz clock for a 1.25 Gbps data rate and is a 1.25 GHz clock for a 2.5 Gbps data rate, respectively.

In operation, the receiving device 14 converts the stream of data 16 into recovered data 18 in accordance with the receive clock 20 and by accounting for drift, asynchronization, and/or received signal impairments as will be further described with reference to FIGS. 2-13. The recovered data 18 may be serial data or parallel data that is outputted by the receiver in accordance with a data output clock 22. As one of ordinary skill in the art will appreciate, the receiving device 14 may be in a front end of a deserializing module, or a deserializer implemented in accordance with one or more standards including, but not limited to, SONET, IEEE 1394, et cetera. Further, the receiving device 14 may be used in any type of integrated circuit that communicates with other integrated circuits, communicates with printed circuit boards and/or discrete circuitry that enables printed circuit board to printed circuit board communication. For instance, the receiving device 14 may be part of a multi-gigabit transceiver (MGT) of a field programmable gate array integrated circuit.

Figure 2:
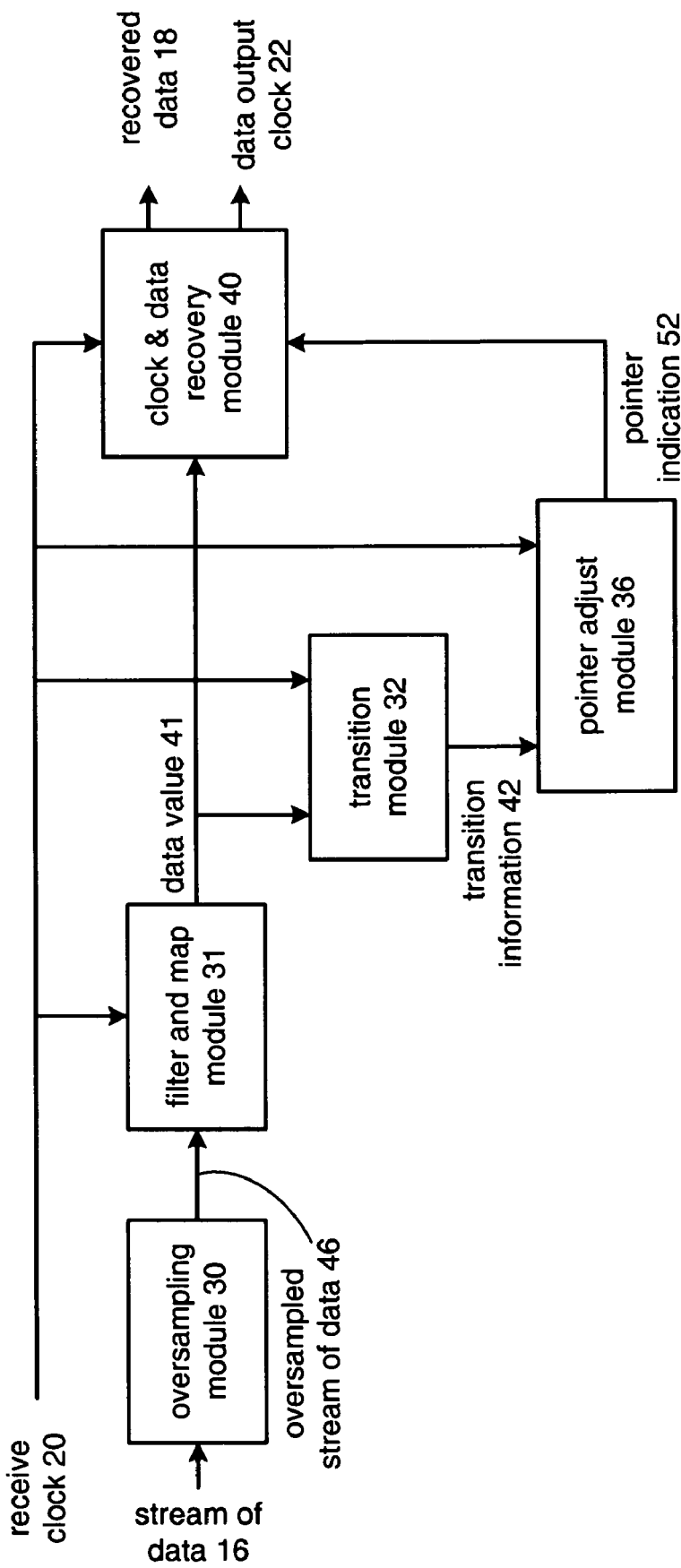
FIG. 2 is a schematic block diagram of a receiving device in accordance with the present invention.

FIG. 2 is a schematic block diagram of an embodiment of receiving device 14 that includes an oversampling module 30, a filter and map module 31, a transition module 32, a pointer adjust module 36, and a clock and data recovery module 40. The oversampling module 30 is operably coupled to oversample the stream of data 16 in accordance with a free running phase locked loop of the oversampling module running in startup mode referencing the receive clock 20 to produce an oversampled stream of data 46.

The filter and map module 31 is operably coupled to filter the oversampled sampled stream of data 46 to produce filtered data in accordance with the receive clock 20. In one embodiment, the filtering may be done by using a match filter and the receive clock 20 may be at a rate greater than the rate of the stream of data 16. For example, the rate of the receive clock 20 may be at least twice the rate of the stream of data 16.

The filter and map module 31 then maps the filtered data into signed data values 41. The signed data values 41 may be three bit values. Note that the mapping may be optimized by ignoring lower probability combinations. Further note that using the pointer value to help improve the mapping and allow for better error corrections and optimize the design, where error correction is for those errors generated from the channel up to (sampling rate/2-1). Even further note that additional optimization of the filtering and mapping may be achieved by partially saving the signed old data.

The transition module 32 generates transition information 42 based on the receive clock 20 and the signed data values 41. In general, the transition information 42 indicates valid transitions of the stream of data 16 and/or of the oversampled stream of data 46.

The pointer adjust module 36 produces a pointer indication 52 based on current and previous transition information 42 and the receive clock 20. In general, the pointer indication 52 is representative of data location in the stream of oversampled data with respect to the receive clock 22 and correction therefor.

The clock and data recovery module 40 is operably coupled to recover data 18 and a data output clock 22 from the signed data values 41 based on the pointer indication 52. In general, the clock and data recovery module 40 recover the original data values 41 based on the pointer indication 52 to make sure the data points are recovered away from the transition locations to produce the recovered data 18. As one of ordinary skill in the art will appreciate, the recovered data 18 may be a parallel output word or a serial output word.

In this example, the sampling point for recovering the data output is synchronous to the data output clock 22 and is desired to be as far away from transition locations of the data as possible to enable low noise data recovery. However, since the receive clock and transmit clock are asynchronous, the sampling point will drift with respect to the transmit clock 15. To compensate for the drift, the pointer adjust module 36 adjusts the sampling point for recovering the data in the clock and data module 40 by keeping the pointer indication 52 in the correct position, i.e., at the recovering point. Accordingly, as the relationship between the transmit clock 15 and the receive clock 20 changes due to drift, asynchronization, and/or received signal impairments; the sampling point is correspondingly adjusted through the pointer indication 52.

In one embodiment, the clock and data recovery module 40 functions to determine equivalent data values from signed data values 41 of data based on the pointer indication 52. The data recover module 40 then maintains a running partitioning of bits of the equivalent data values into current bits, an extra bit and history bits. The data recovery module 40 further determines an offset data word and an extra data word from the current bits, the extra bits and the history bits in accordance with the asynchronization between the receive clock and the transmit clock. This will be further described with reference to FIGS. 3-13.

In another embodiment, the clock and data recovery module 40 functions to determine whether to add or remove a bit from the recovered data word 18 based on the asynchronization between the receive clock and transmit clock. The data recover module 40 then stores the offset data word and the extra data word in an interim register when a bit is to be added or removed. The data recover module 40 also stores the offset data word in the interim register when a bit is not to be added or removed. The data recovery module 40 then functions to recover the data from the interim register at a rate of the data output clock.

The clock and data recovery module 40 may determine whether to add or remove the bit by determining a number of bits of the equivalent data value occurring during a number of cycles of the data output clock. The number of bits of the equivalent data values is compared with an expected number of bits. When the number of bits of the equivalent data values exceeds the expected number of bits, the data recovery module indicates that a bit is to be removed. When, however, the number of bits of the equivalent data value is less than the expected number of bits, the data recovery module indicates that a bit is to be added.

At some point in time while the clock and data recovery module 40 is recovering data 18, the sampling point, based on the pointer indication 52, will be adjusted as far as it can go with respect to the transitions of the data. When this occurs, the data output clock needs to be adjusted and the sampling point that is controlled by the pointer indication 52 is reset to an original position, or value.

In one embodiment, the clock and data recovery module 40 adjusts at least one cycle of the data output clock 22 in accordance with a cycle of the receive clock 22. For example, when the rate of the output data clock 22 is to be increased, a cycle of the output data clock 22 is reduced in accordance with a period of the receive clock 20. Conversely, when the rate of the data output clock 22 is to be decreased, the clock adjust module 38 increases a cycle of the data output clock by a period of the receive clock 20.

Figure 3:
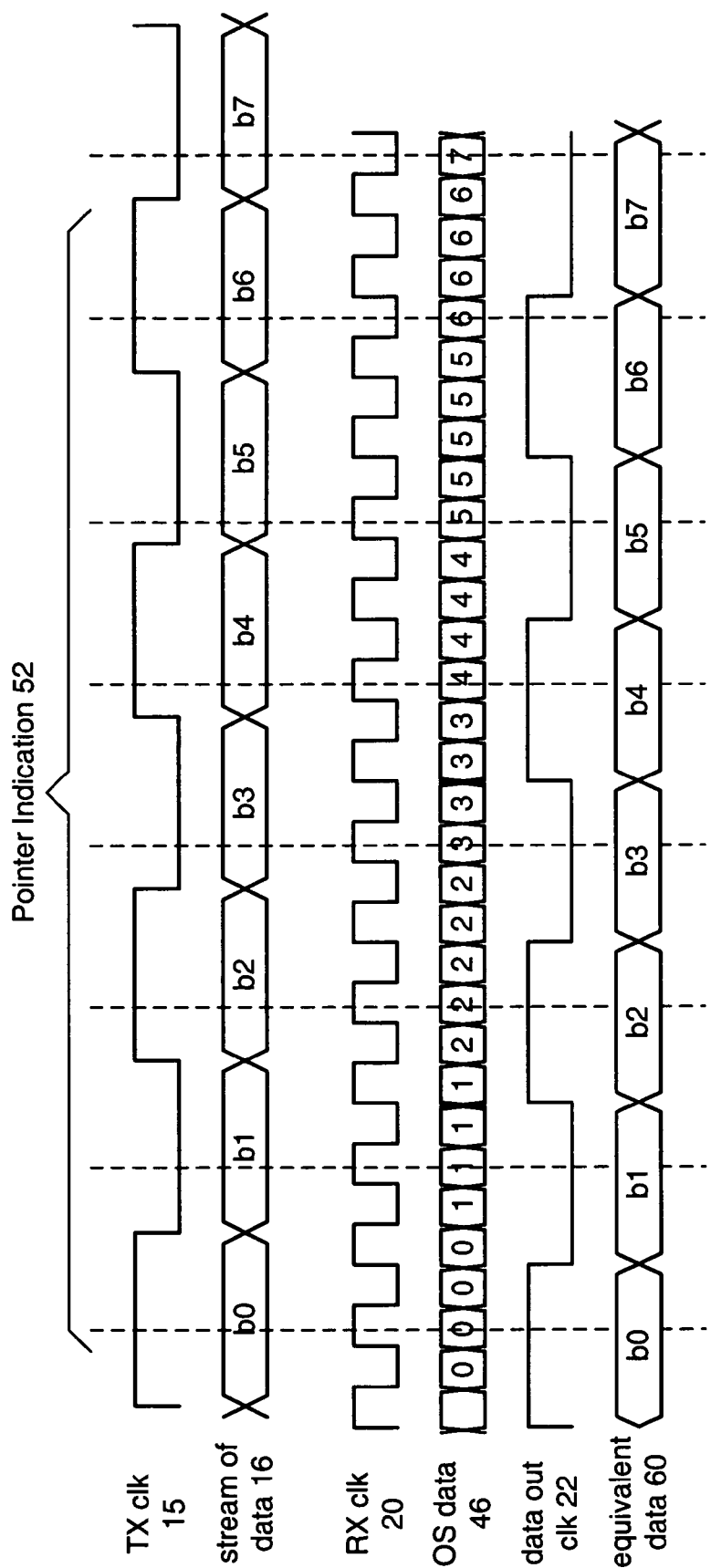
FIG. 3 is a timing diagram of operation of the receiving diagram of FIG. 2.

FIG. 3 illustrates a timing diagram of the operation of the receiver of FIG. 2. In this embodiment, the transmit clock 15, stream of data 16, receive clock 20, oversampled data 46, data output clock 22 and equivalent data 60 are represented for 8-bits of the stream of data 16. As is also shown, pointer indications 52 are adjusted with respect to the transmit clock 15 and receive clock 20 to ensure that the recovering of the data occurs at recovering points away from the transitions of the data 16 and/or data 46.

As shown is further shown, the pointer indications 52 are adjusted from sampling the oversampling data 46 bit position number with respect to the receive clock. As shown in the $1^{st}$ interval of the receive clock 20 that corresponds to one period of the data output clock 22, four samples occur where the sampling is taking place at the $3^{rd}$ oversampled position. This remains the sampling position of choice until the $6^{th}$ bit of the incoming data where the sampling preference is shifted to the $4^{th}$ position. Over time, as the receive clock 20, which is at a rate faster than the transmit clock by slightly more than a 4× rate, the data positioning shifts causing the pointer indication 52 to be readjusted. The next readjustment, in this example, will be back to the initial position (i.e., the $1^{st}$ sampling position). As long as the difference in clocks maintains this relationship, the pointer adjustment will continue is this manner (e.g., rotating through recovering point positions 1-4). For an 8× oversampling embodiment, the pointer indication may range from oversampling position 1 to oversampling position 8 or a subset of those oversampling positions.

Figure 4:
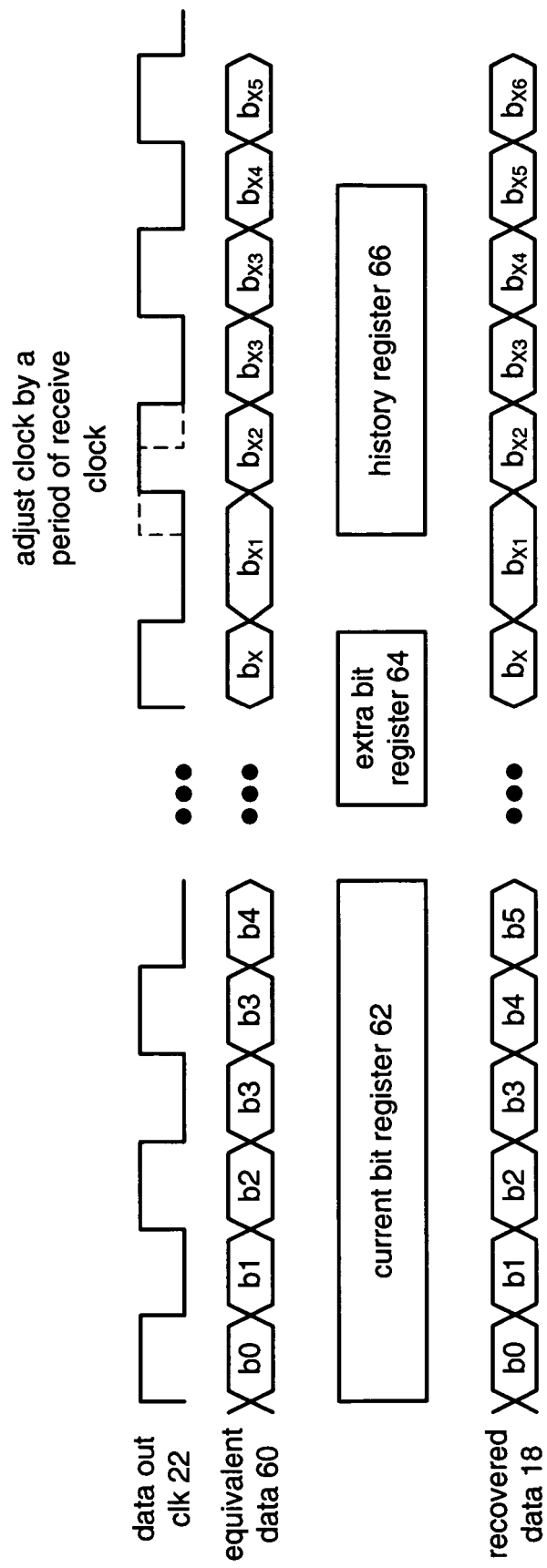
FIG. 4 is a further timing diagram illustrating the operation of the receiving device of FIG. 2.

FIG. 4 is a further timing diagram of the operation of the receiver of FIG. 2. In this illustration, the data output clock 22, equivalent data 60 and recovered data 18 are illustrated. Further illustrated are current bit register 62, extra bit register 64 and history register 66, which reside within the data recovery module 40 and are used to store the equivalent data 60 and produce the recovered data 18 when the receive clock 20 frequency is a fraction faster or slower than an integer multiple of the transmit clock frequency. For example, when the receive clock 20 frequency is a fraction greater than a multiple of the transmit clock less data bits will be accumulated in the sampling of the incoming data. Conversely, when the receive clock 20 frequency is a fraction less than a multiple of the transmit clock frequency extra data will be recovered over time than is received. The data as it is sampled and recovered via the equivalent data 60 is stored in the current bit register 62, extra bit register 64 and history register 66.

When the receive clock 20 frequency is less than a multiple of the transmit clock frequency, the extra bits are stored and shifted through until a point where the pattern is repeated and the rate of the data output clock 22 is adjusted. In this example, the rate of the data output clock 22 is adjusted by one period of the receive clock 20. When less bits are being recovered via the equivalent data than transmitted due to a slower running receive clock 20, the registers 62-66 are used to repeat data when needed to ensure that the recovered data 18 is an accurate representation of the transmitted data. In this latter example, the data output clock 22 is adjusted by adding a period of the receive clock 20 to a cycle of the data output clock 22.

Figure 5:
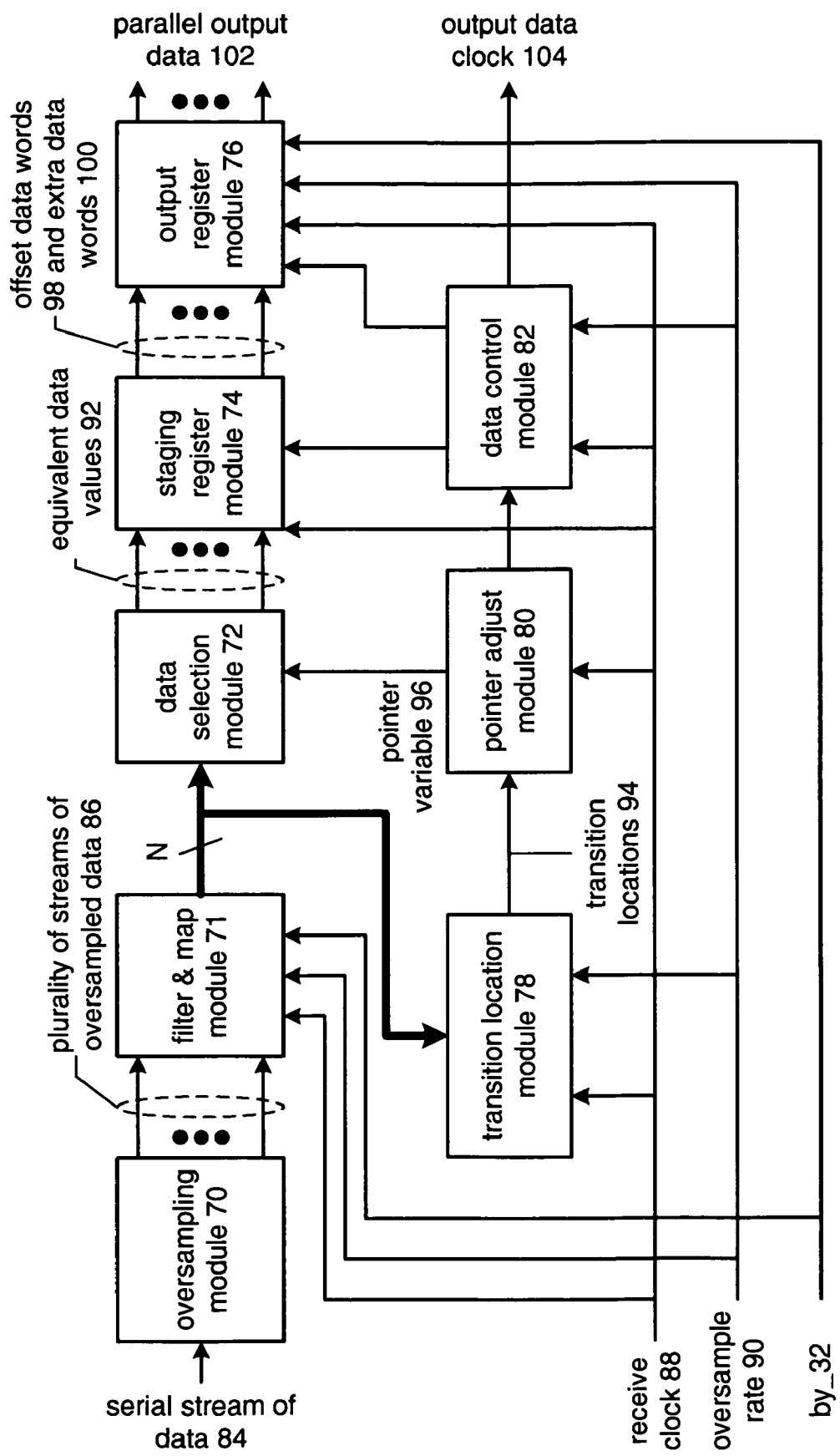
FIG. 5 is a schematic block diagram of another embodiment of a receiving device in accordance with the present invention.

FIG. 5 is a schematic block diagram of another embodiment of a receiving device 14. In this embodiment, the receiving device 14 includes an oversampling module 70, a filter and map module 71, a data selection module 72, a staging register module 74, an output register module 76, a transition location module 78, a pointer adjust module 80 and a data control module 82.

In general operation, the receiving device 14 provides a high speed transmission of digital data using 2-level signaling. The receiving device 14 decodes a serial bit stream 84 and assembles a group of received bits into parallel words 102 that are more easily clocked and/or further processed at lower speeds. The receiving device 14 takes a sample of each incoming bit, where the sign of the sample determines whether the bit is a binary one or zero. Each bit is clocked into a shift register within the register module 70. As the original data is recovered from the oversampled group of bits in plurality as shown in output of data selection module 72 equivalent data 92, the equivalent data 92 is further parallelized by shifting multiples of it together to form a bigger word width this is done in register module 74 and/or 76 until a desired parallel word 102 is constructed. To achieve this, when the serial stream of data 84 is at a lower rate than the receive clock 88, the oversampling module 70 oversamples the incoming data 84 and produces digital samples there from. This enables a large number of samples to be processed simultaneously to perform the desired parallel output data 102. For example, 80 samples of an 8× oversampled data stream becomes a 10-bit word.

In more specific operation, the oversampling module 70 receives the serial stream of data 84 and produces a plurality of streams of oversampled data 86 in accordance with a free running phase locked loop. The filter and map module, which will be described in greater detail with reference to FIGS. 6-8, produces signed data values from the plurality of streams of oversampled data 86 based on the receive clock 88, an oversampling rate 90, an input mode select (which indicates the number of bits present at the output of the oversampling module 70), and an oversampling mode select (e.g., by__32). An output mode select indicates a number of bits that are to be present in the parallel output data 102. In one embodiment, the output word 102 may be 32 bits, 40 bits, et cetera. As such, when the by__32 mode select is enabled, the output 102 will be 32 bits when not enabled, the output will be 40 bits. In another embodiment the oversampled data 86 may be 32 bits, 40 bits, et cetera, and similarly when the by__32 mode select is enabled the oversampled data 86 will be 32 when not enabled, the oversampled data 86 will be 40 bits. In yet another embodiment, the input mode select and the output mode select could have different values or they could have the same values.

The transition location module 78 interprets the signed data values based on the receive clock 88 and the oversampling rate 90, which may be 4×, 8× or any other oversampling rate to produce a produced transition locations 94. The function of the transition location module will be described in greater detail with reference to FIG. 9.

The pointer adjust module 80 produces a pointer variable 96 based on the transition locations 94 and the receive clock 88. Generally, the pointer adjust module 80 determines the sampling point for the plurality of streams of oversampled data 86 and provides it to the data selection module 72.

The data control module 82 is operably coupled to provide timing information to the staging register 74 and the output register module 76. Further, the data control module 82 generates an output data clock 104. A more detailed discussion of the pointer adjust module 80 and the data control module 82 will be provided below.

The data selection module 72 is operably coupled to sample, in accordance with the pointer variable 96, each of the plurality of streams of oversampled data 86 and to produce therefrom equivalent data values 92. The data selection module 72 will be described in greater detail with reference to FIG. 10.

The staging register module 74 receives the equivalent data values 92 and the receive clock 88 and produces therefrom offset data words 98 and extra data words 100. The staging register module 74 will be described in greater detail with reference to FIG. 11.

The output register module 76 receives the offset data words 98 and the extra data words 100 and produces, in accordance with the oversampling rate 90 the receive clock 88 and the bi__32 signal, the parallel output data 102. The output register module 76 will be described in greater detail with reference to FIG. 12.

The pointer adjust module 80 generates on one of four pointer values (eight values in the 8× mode) based on input received from a transition calculation. The response of pointer adjustment is intended to be slow and based on the accumulation of transition location statistics. A three bit configuration input "dcdrFilter" controls the relative response time. The pointer value selects data bits from the filter output sets. The pointer value is also monitored by data control module 82 to regulate the staging of data arriving from data selection.

In one embodiment, the pointer adjust module 80 includes a signed binary up/down counter. The counter is clocked with clk_in and has a complex up/down control adapted to the problem. The current value of pointer is stored in flip-flops. The pointer controls a set of multiplexers, which remap the transLoc inputs (i.e., the transition locations 94) to be pointer relative. For example, in a 4× oversampling system, the pointer has a value of 2. TransLoc[2] indicates transitions at the pointer location, transLoc[3] and transLoc[1] signal transitions at pointer +1 and pointer −1 respectively, and transLoc[0] indicates activity at pointer +/−2.

A countCntrl[3:0] internal to the pointer adjust module 80 controls action of the up down counter. Each time the counter over-ranges, it is reset to zero and the pointer is updated. If the counter overflows, the pointer is assigned the next clockwise state of pointer. If the over-range was an underflow the next counterclockwise state is assigned. The new pointer value modifies the remapping of transLoc[3:0] to produce a new countCntrl[3:0] consistent with the pointer's new state.

In this example embodiment, the pointer adjust module 80 may take one of seven actions in response to nine unique countCntrl states. For an idealized input, with transitions at the current value of the pointer, the countCntrl state is 0010 and the count remains forever at zero and the pointer will never change. For a real input having no net phase shift, inter symbol interference and quantization noise introduced by the oversampling ADC operation (all of what mentioned will result in drift) will likely result in the count moving in a relatively tight symmetrical range about the zero value. As input phase shifts, the dominant countCntrl state will shift from 0010 to either of 0001 or 0100 and the count will move to overrange and a pointer adjustment.

The counter is 8 bit sign-magnitude with zero in the center of the counting range. Overflow and underflow are symmetric about the zero. The "dcdrFilter[2:0]" input selects the number of counts (both negative and positive) to over-range according to the following table.

| DCDRFILTER[2:0] | OVERRANGE |
|---|---|
| 000 | ±7 counts |
| 001 | ±15 counts |
| 010 | ±31 counts |
| 011 | ±79 counts |
| 100 | ±111 counts |
| 101 | ±127 counts |
| 110 | ±255 counts |
| 111 | ±511 counts |

Two control of data flow signals are decoded from the count over-range states. The overflow state of the pointer adjust counter signals "increment" while the underflow state signals "decrement". Both signals are inputs to Data Control.

In one embodiment, the data control module 82 uses pointer state and direction inputs to derive control signals for the staging register and interface registers.

The "clk_out" data clock is extracted in this block. The signals "pushOne" and "popOne" are defined as events of one clock duration which mark the insertion and deletion, respectively, of single bits in the data stream. The control output "pushBit" is "pushOne" delayed by one clock period. The "offset" control output is derived from a state up/down counter. The counter is incremented one state each time "pushOne" is signaled. The counter is decremented one state each time "popOne" is signaled.

When 8× oversampling is selected, offset is changed on pointer modulo 4 as well as at maximum. At the modulo 4 boundary, a bit is not being inserted or removed from the stream, but the valid data out of the sample block shifts between dataOut[8,6,4,2,0] and dataOut[9,7,5,1]. This change is accommodated by changing the offset to keep the location of valid data at the staging register output pinned to offsetData[8,6,4,2,0]. This complication allows the 4× and 8× oversampling functions to share hardware.

The "selectExtra" and "load" control outputs are derived from a three state machine which tracks word based events. "NORMAL", "OVERFLOW", and "UNDERFLOW" states are defined. The "NORMAL" state corresponds to the case where one word is moved from the staging register's "offsetData" output to an interim register in one clock cycle.

The "OVERFLOW" state is visited for one clock period. This state corresponds to the case where two words are moved from the staging register's "offsetData" and "extraWord" outputs to two interim registers. The "load[3:0]" control output is modified on entering this state and modified again on state exit. The "UNDERFLOW" state is also visited for one clock period. This state corresponds to the case where no new data is available from the staging register. For this case "offsetData" outputs the same value as for the previous clock cycle. The "load" control output freezes on state entry causing a second write to the same interim register. Sequencing of "load" resumes on state exit.

Figure 6:
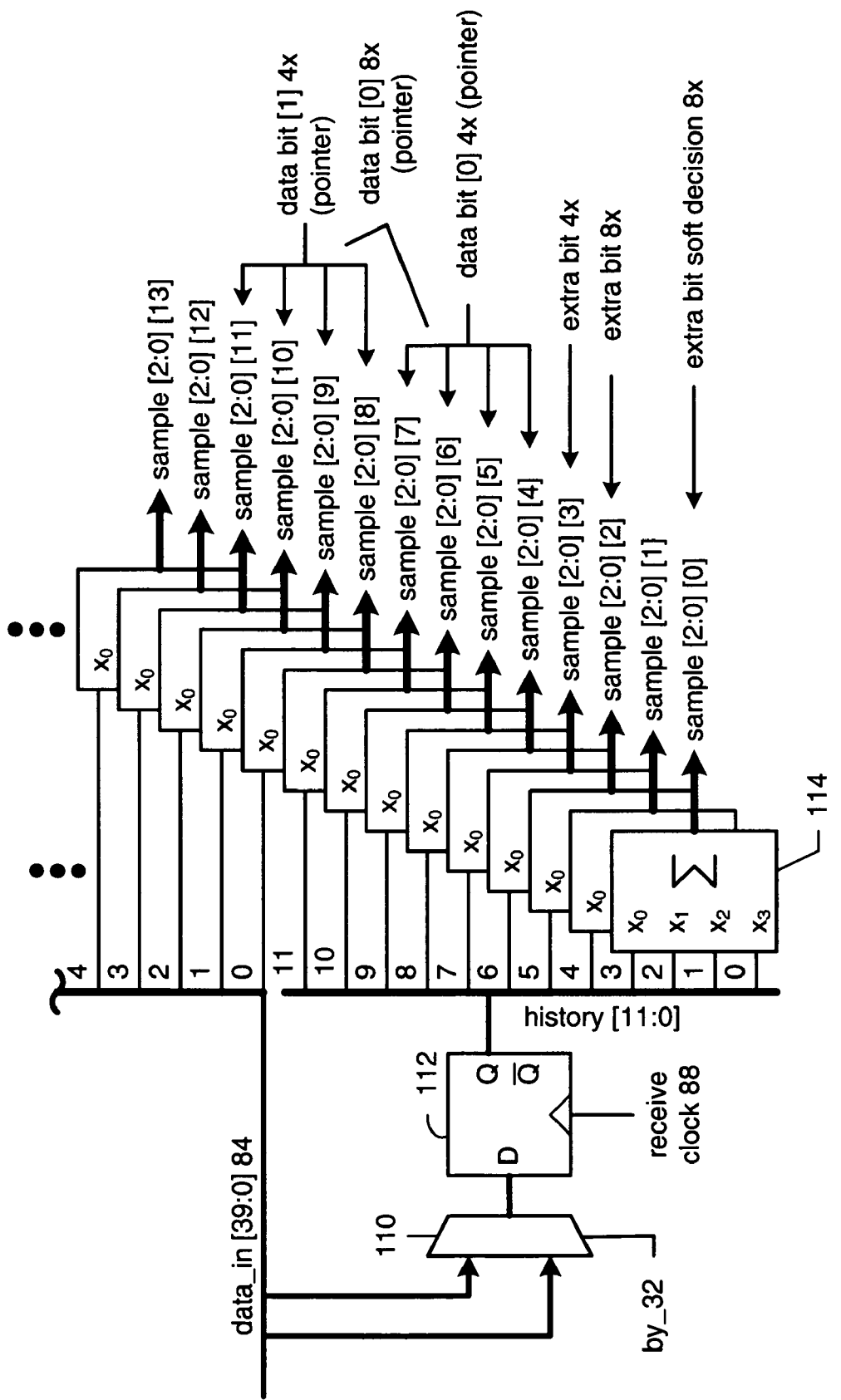
FIG. 6 is a schematic block diagram of filtering within an oversampling module in accordance with the present invention.

FIG. 6 illustrates a diagram that depicts the filtering that occurs within the filter and map module 71. Such filtering is based on match filtering, where each position of a 40-bit input (e.g., data_in [39:0] 84) plus 12 bits of the history data are processed. The processing may be done at 4-bits-per-time interval for 4× oversampling or 8-bits-per-time interval for 8× oversampling or at any number of bits for a given oversampling rate. The bits are then mapped into a signed 3-bit value, which is not shown. Accordingly, the filtering 114 processes 4 bits at a time to produce a corresponding 3-bit sample then each sample is mapped to a signed number where the zero is in the middle of the range. The inputs to compute the samples include a history portion and a new portion. The history portion is to correct for discontinuity in the serial interface that was lost when signals are parallelized. Further, the mapped samples are used to move pointers, and extra bits for subsequent processing.

FIG. 7 illustrates a schematic diagram for determining a particular data bit value within the filter and map module 71 when the oversampling rate is 4. As shown, the sign and magnitude of a signal over 4 bit samples are processed via an OR gate 122 and an AND gate 120 to produce a corresponding bit value for each of the over sampled data positions. In addition to passing the data value as the sign bit for the data bit being recovered Another advantage for the circuit shown is to allow for two consecutive 0 bits in oversampled bits in a sea of ones to indicate an original bit as 0 performing error correction, same argument reversed applies to two consecutive is in sea of 0s.

FIG. 8 is a logic diagram for determining transitions that occurs within the filter and module 71. In this instance, 3 bits of information (a current bit, a previous bit, and a next bit) are used as inputs for an exclusive OR gate 124 and two AND gates 126 and 128 to determine transitions for each of the corresponding input bits locations.

Figure 9:
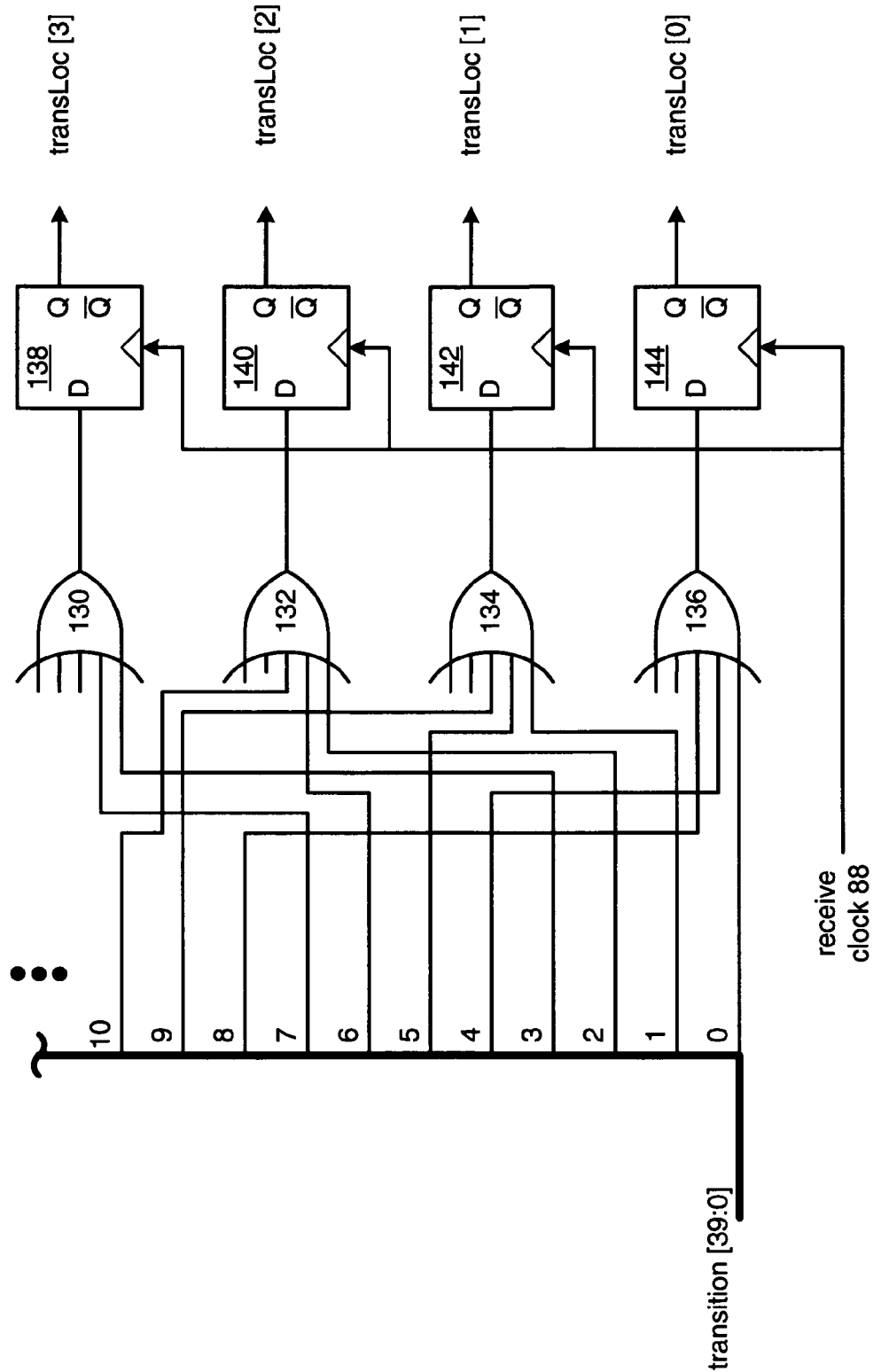
FIG. 9 is a schematic block diagram of a transition location module in accordance with the present invention.

FIG. 9 is a schematic block diagram of an embodiment of the transition location module 78 that includes a plurality of OR gates 130-136 and a plurality of D flip-flops 138-144. The transition values as produced by the circuitry of FIG. 8 are provided as inputs to the OR gates 130-136. In accordance with the receive clock, the D flip-flops indicate whether the transition occurs within the $1^{st}$ sampling interval, $2^{nd}$ sampling interval, $3^{rd}$ sampling interval or $4^{th}$ sampling interval for a 4× oversampling rate. For example, for a 40-bit input transitions at bits 0, 8, 16, 24, and 32 correspond to bit zero (i.e., transloc[0]), a transition in bits 1, 9, 17, 25, and 34 are represented by bit 1 (i.e., transloc[1]), and a transition in bits 2, 10, 18, 26, and 35 are represented in the $3^{rd}$ bit (i.e., transloc[2]), et cetera. The same processing occurs if an 8× oversampling is used where the transition may occur within one of 8 positions. Note that due to the asynchronous nature of the transmit and receive clocks a transition location will drift and the corresponding pointer value will be adjusted accordingly. Note that the pointer may be adjusted only after a preset counter confirms the move of the transition as real and not just the result from difference in frequency or erroneous samples.

Figure 10:
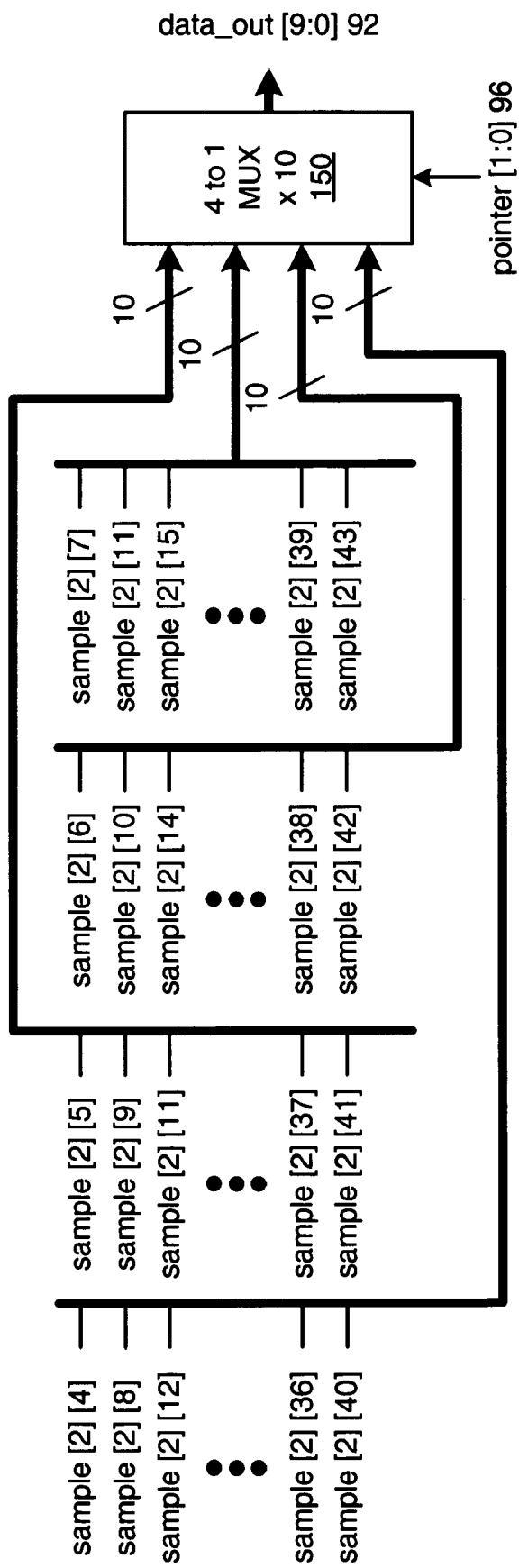
FIG. 10 is a schematic block diagram of a data selection module in accordance with the present invention.

Using the pointer value, an equivalent 10-bit value is determined via the data selection module 72 as shown in FIG. 10. In this embodiment, the data selection module 72 includes 10 4-to-1 multiplexers that select, based on the pointer 96, samples to produce the 10-bit data output 92, which corresponds to the equivalent data values. In one embodiment, the pointer value 0 propagates data bits 0, 4, 8, 12, . . . 36, pointer value 1 propagates data bits 1, 5, 9, 13, . . . 37, pointer value 2 propagates data bits 2, 6, 10, 14, . . . 38, and pointer value 4 propagates data bits 3, 7, 11, 15, . . . 39.

Since the sampling frequency is allowed to be different within certain tolerances from the original frequency used at the transmitter, more or less data may be handled than the normal rate. This is achieved through changing the output clock that is timed with the output data by shrinking or elongating one cycle as the pointer keeps shifting in the same direction to reset the pointer back to its initial position. The mechanism used to achieve this is described in FIGS. 11 and 12.

Figure 11:
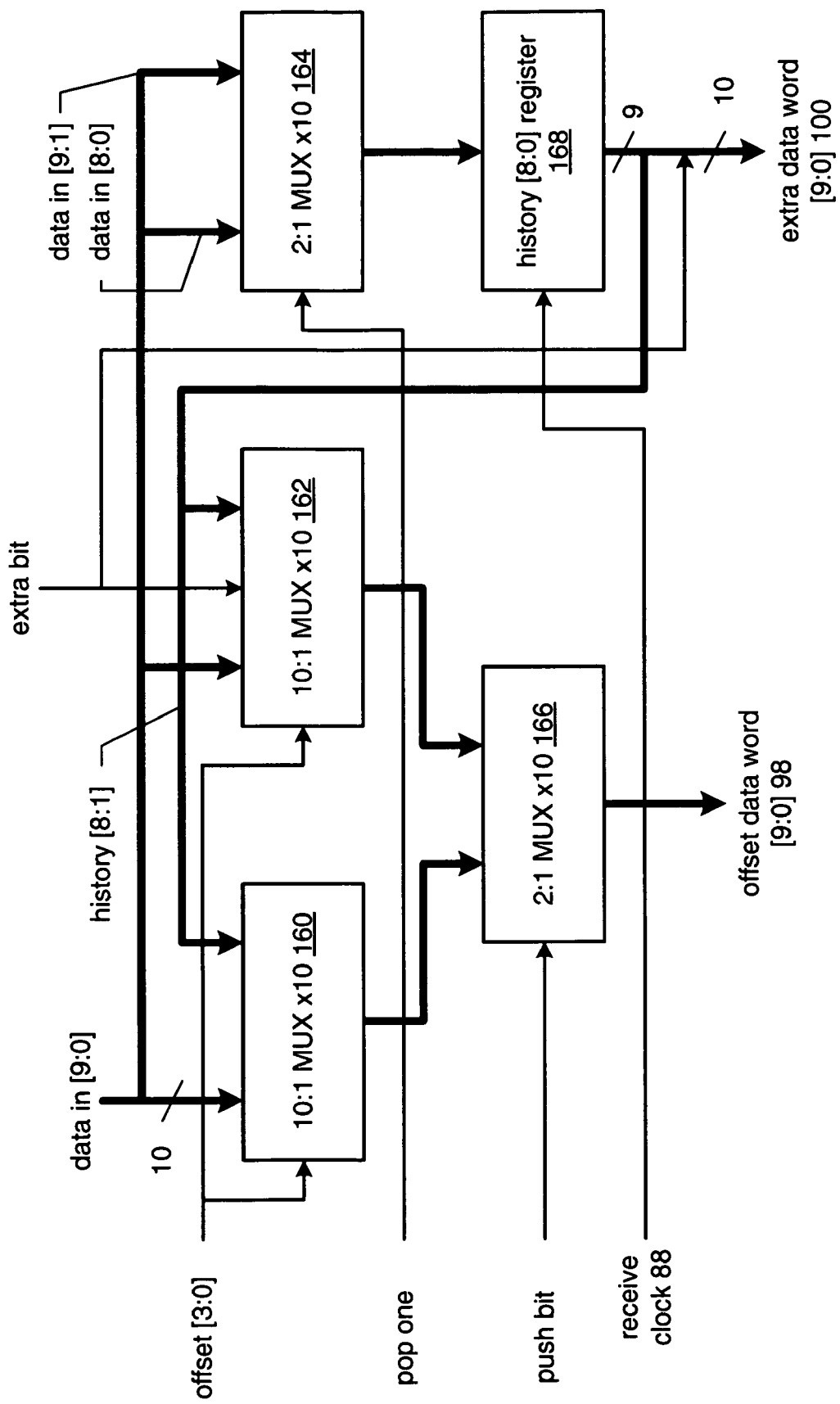
FIG. 11 is a schematic block diagram of a staging register module in accordance with the present invention.

FIG. 11 illustrates the staging register module 74 that includes 10-to-1×10 multiplexers 160, 162, 2-to-1×10 multiplexers 164 and 166, and a history register 168. The staging register module 74 receives a 10-bit data input (data in [9:0]) that was previously calculated using the current pointer position. In addition, a delayed version of the data input (history) are muxed through the multiplexers 160,162 and 166 to produce an offset data word 98. The history data word is produced by multiplexing 9 bits of the input data with a different 9 bits of the input data via multiplexer 164. In addition, an extra bit is provided to the output of the history register 168 to produce the extra data word 100.

Figure 12:
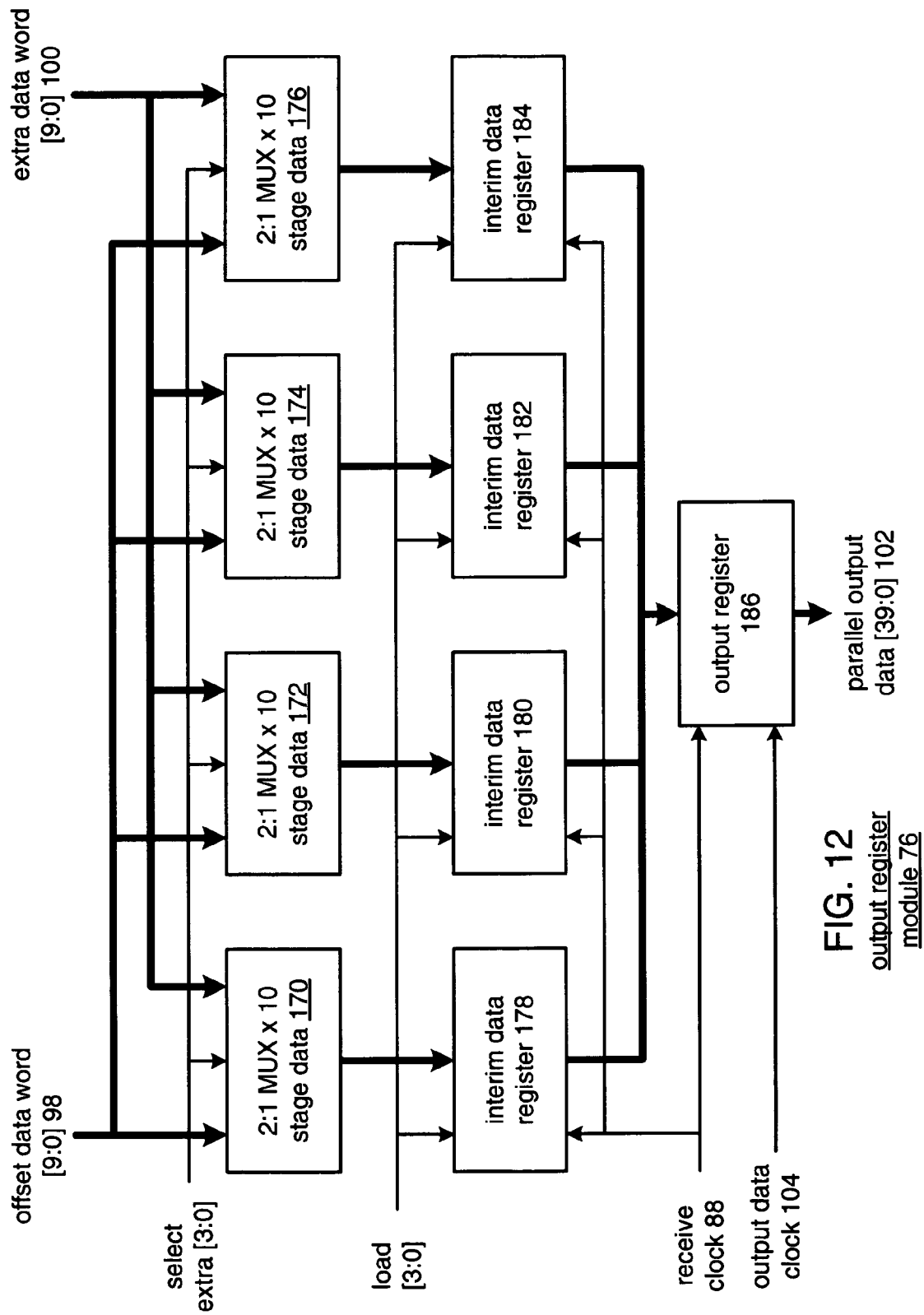
FIG. 12 is a schematic block diagram of an output register module in accordance with the present invention.

FIG. 12 is a schematic block diagram of the output register module 76 that includes a plurality of 2-to-1×10 multiplexers 170,172,174 and 176, a plurality of bit interim data registers 178, 180, 182 and 184, and a 40-bit output register 186. In operation, based on a select extra signal the multiplexers 170-176 pass the corresponding offset data word 98 and/or the extra data word 100 to the corresponding interim data register 178-184. Based on the load control the right interim register is loaded with the latest ready data, this is normally done cyclically between interim registers, 178, 180, 182, 184 and then back to 178 and so on. In accordance with the receive clock 88 the output register 186 stores data from the interim data registers 178-184. Based on the same controls that generates the clocks to make sure that they are synchronized and the output data clock 104, the output register 186 provides the parallel output data 102.

Figure 13:
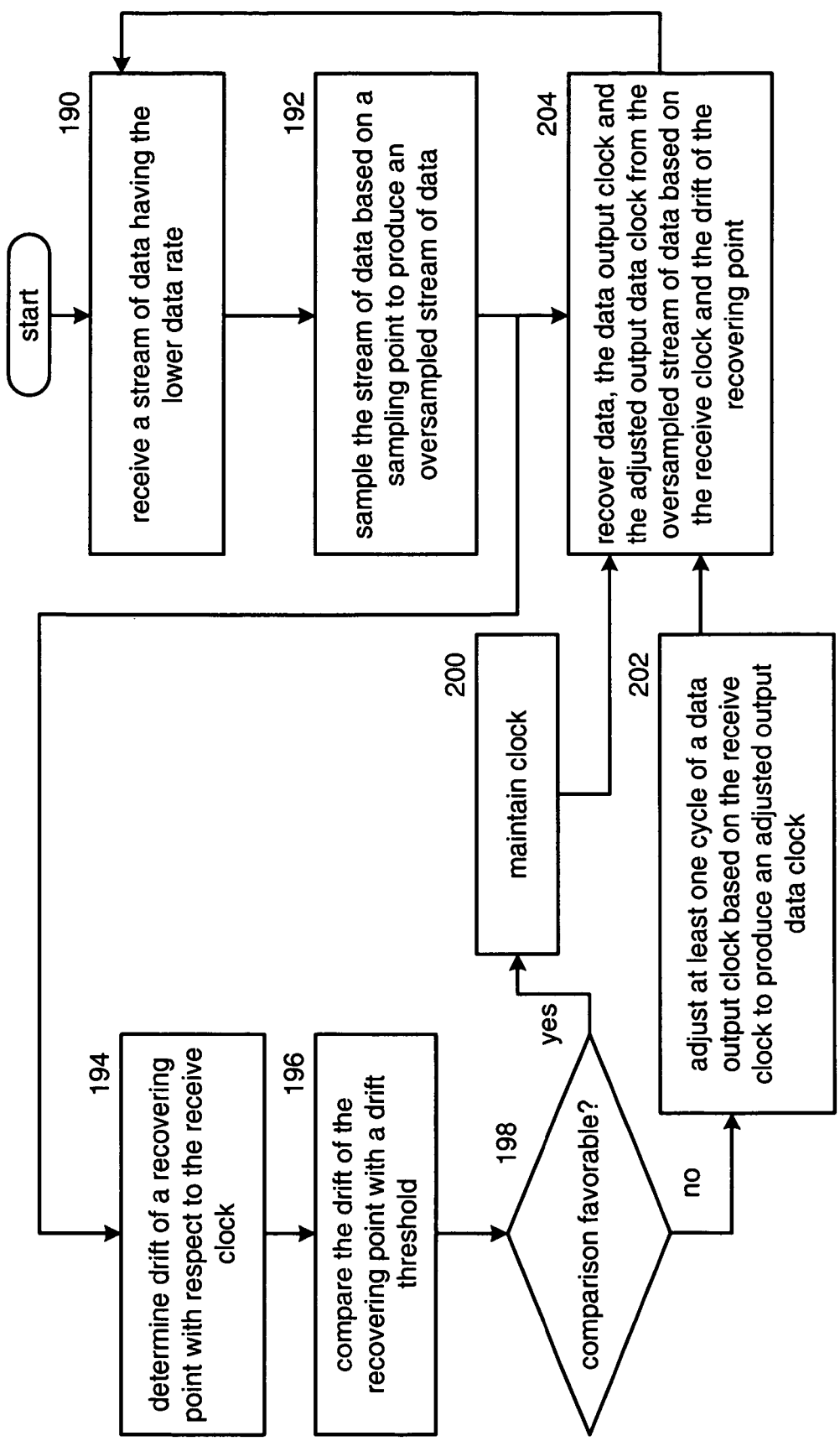
FIG. 13 is a logic diagram of a method for receiving data at a lower data rate in accordance with the present invention.

FIG. 13 is a logic diagram of a method for receiving data at a lower data rate. The process begins at Step 190 where a stream of data having the lower data rate is received. The lower data rate corresponds to a transmit clock which may be $\frac{1}{4}^{th}$, $\frac{1}{8}^{th}$, et cetera the rate of a receive clock.

The process proceeds to Step 192 where the stream of data is sampled based on a sampling point to produce an oversampled stream of data. Note that this may be done in a parallel operation. Further note that the sampling point is based on the received clock and old transitions of the stream of data that were already used to set the pointer to the correct location. Still further note that the receive clock is multiples greater than the rate of the transmit clock and the receive and transmit clocks are asynchronous.

The process then proceeds to Step 194 and to Step 204. At step 194, the process determines drift of a recovering point with respect to the receive clock. The process then proceeds to Step 196 where the drift of the recovering point is compared with a drift threshold.

The process then proceeds to Step 198 where a determination is made as to whether the comparison of Step 196 was favorable. If yes, the clock is maintained at Step 200 and the process proceeds to Step 204. If, however, the comparison was not favorable, the process proceeds to Step 202 where at least one cycle of the data output clock is adjusted based on the receive clock to produce an adjusted output clock. Note that the receive clock is an oversampling rate greater than the rate of the output data clock.

At Step 204, the process continues by recovering data, the data output clock and the adjusted output data clock from the oversampled stream of data based on the receive clock and the drift of the recovering point.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for receiving data at a lower data rate. As one of ordinary skill in the art will appreciate, other embodiments may be derived from the teaching of the present invention without deviating from the scope of the claims.

What is claimed is:

1. A method for receiving data at a lower data rate, the method comprises:
   receiving a stream of data having the lower data rate, wherein the lower data rate corresponds to a transmit clock;
   sampling the stream of data based on a free running sampling point to produce an oversampled stream of data, wherein the sampling point is based on a receive clock and extracted transitions of the stream of data, wherein rate of the receive clock is multiples greater than a rate of the transmit clock and wherein the receive clock is asynchronous with the transmit clock;
   determining drift of a recovering point with respect to the receive clock;
   comparing the drift of the recovering point with a drift threshold;
   when the drift of the recovering point compares unfavorably with the drift threshold, adjusting at least one cycle of a data output clock based on the receive clock to produce an adjusted output data clock, wherein the rate of the receive clock is an oversampling rate greater than a rate of the output data clock; and
   recovering data, the data output clock and the adjusted output data clock from the oversampled stream of data based on the receive clock and the drift of the recovering point.

2. The method of claim 1, wherein the sampling the stream of data based on a sampling point comprises, on a bit by bit basis of the stream of data:
   determining a data value for a current bit of the stream of data based on the current bit, a previous bit, and a successive bit of the stream of data; and
   determining transition information for the current bit based on the previous bit and the successive bit.

3. The method of claim 1 wherein the sampling comprises;
   filtering the oversampled stream of data to produce filtered data; and
   mapping the filtered data into signed data values.

4. The method of claim 1, wherein the recovering the data comprises:
   determining equivalent data values from the oversampled stream of data based on the recovering point;
   maintaining a run partitioning of bits of the equivalent data values into current bits, an extra bit, and history bits; and
   determining an offset data word and an extra word from the current bits, the extra bit, and the history bits in accordance with the asynchronization between the receive clock and the transmit clock.

5. The method of claim 4, wherein the recovering the data comprises:
   determining whether to add or remove a bit based on the asynchronization between the receive clock and the transmit clock;

when the bit is to be added or removed, storing the offset data word and the extra word in an interim register;

when the bit is not to be added or removed, storing the offset data word in the interim register; and recovering the data is recovered from the interim register at the rate of the data output clock.

6. The method of claim 5, wherein the determining whether to add or remove the bit comprises:

determining a number of bits of the equivalent data value occurring during a number of cycles of the data output clock;

comparing the number of bits of the equivalent data values with an expected number of bits;

when the number of bits of the equivalent data values exceeds the expected number of bits, indicating that a bit is to be removed; and when the number of bits of the equivalent data values is less than the expected number of bits, indicating that a bit is to be added.

7. The method of claim 1, wherein the adjusting at least one cycle of a data output clock based on the receive clock comprises:

when the rate of the data output clock is to be increased, reducing a cycle of the data output clock by a period of the receive clock; and when the rate of the data output clock is to be decreased, increasing a cycle of the data output clock by a period of the receive clock.

8. The method of claim 1, wherein the sampling the stream of data based on the sampling point to produce an oversampled stream of data comprises:

deserializing the stream of data into a plurality of streams of data; and sampling each of the plurality of streams of data based on the sampling point to produce a plurality of streams of oversampled data that corresponds to the oversampled stream of data.

9. A receiver operable to receive data at a lower data rate than a rate of a receive clock, the receiver comprises:

oversampling module operably coupled to oversample a stream of data having the lower data rate to produce an oversample stream of data, wherein the lower data rate corresponds to a transmit clock;

filter and map module operably coupled to produce signed data values from the oversampled stream of data;

transition module operably coupled to determine transition information from the signed data values based on a receive clock, wherein rate of the receive clock is multiples greater than a rate of the transmit clock and wherein the receive clock is asynchronous with the transmit clock;

pointer adjust module operably coupled to produce pointer indication based on the transition information and the receive clock;

clock and data recovery module operably coupled to recover data and a data output clock from the signed data values based on a pointer and the receive clock, wherein the pointer is based on the receive clock and transitions of the stream of data and is adjusted in accordance with the pointer indication.

10. The receiver of claim 9, wherein the clock and data recovery module functions on a bit by bit basis to:

determine a data value for a current bit of the stream of data based on the current bit, a previous bit of the stream of data, and a successive bit of the stream of data; and determine transition information for the current bit based on the previous bit and the successive bit.

11. The receiver of claim 10, wherein the filter and module functions to:

filtering the oversampled stream of data to produce filtered data; and mapping the filtered data into signed data values.

12. The receiver of claim 9, wherein the clock and data recovery module further functions to recover the data by:

determining equivalent data values from the oversampled stream of data based on a recovering point;

maintaining a run partitioning of bits of the equivalent data values into current bits, an extra bit, and history bits; and determining an offset data word and an extra word from the current bits, the extra bit, and the history bits in accordance with the asynchronization between the receive clock and the transmit clock.

13. The receiver of claim 12, wherein the clock and data recovery module further functions to recover the data by:

determining whether to add or remove a bit based on the asynchronization between the receive clock and the transmit clock;

when the bit is to be added or removed, storing the offset data word and the extra word in an interim register;

when the bit is not to be added or removed, storing the offset data word in the interim register; and recovering the data is recovered from the interim register at the rate of the data output clock.

14. The receiver of claim 13, wherein the determining whether to add or remove the bit comprises:

determining a number of bits of the equivalent data value occurring during a number of cycles of the data output clock;

comparing the number of bits of the equivalent data values with an expected number of bits;

when the number of bits of the equivalent data values exceeds the expected number of bits, indicating that a bit is to be removed; and when the number of bits of the equivalent data values is less than the expected number of bits, indicating that a bit is to be added.

15. The receiver of claim 9, wherein the clock and data recovery module further functions to adjust at least one cycle of a data output clock based on the receive clock by:

when the rate of the data output clock is to be increased, reducing a cycle of the data output clock by a period of the receive clock; and when the rate of the data output clock is to be decreased, increasing a cycle of the data output clock by a period of the receive clock.

16. The receiver of claim 9, wherein the oversampling module further functions to sample the stream of data based on the sampling point to produce an oversampled stream of data by:

deserializing the stream of data into a plurality of streams of data; and sampling each of the plurality of streams of data based on the sampling point to produce a plurality of streams of oversampled data that corresponds to the oversampled stream of data.

17. A receiver operable to receive data at a lower data rate than a rate of a: receive clock, the receiver comprises:

an oversampling module operably coupled to convert a serial stream of data into a plurality of streams of oversampled data based on the receive clock, wherein the serial stream of data is at the lower data rate, wherein the lower data rate corresponds to a transmit clock;

transition location module operably coupled to determine transition locations of the plurality of streams of oversampled data and the receive clock;

pointer adjust module operably coupled to determine a pointer variable based on the transition locations and the receive clock;

data selection module operably coupled to determine an equivalent data value for each of the plurality of streams of oversampled data based on the pointer variable;

staging register module operably coupled to produce an offset data word and an extra data word from the equivalent data value for each of the plurality of oversampled data streams; and output register module operably coupled to produce a parallel data output from at least one of the offset data word and the extra data word.

18. The receiver of claim 17, wherein the oversampling module comprises:

a matched filter module operably coupled to map each position of an M-bit input plus an N-bit old data value of the serial stream of data into a signed data value in accordance with an oversampling rate for each of the plurality of streams of oversampled data.

19. The receiver of claim 18, wherein the transition location module comprises:

transition determining module operably coupled to determine data transitions for each of the plurality of streams of oversampled data based on the signed data value; and transition folding module operably coupled to convert the data transitions into the transition locations.

20. The receiver of claim 17, wherein the data selection module comprises:

a plurality of oversampling rate to one multiplexers, wherein each of the plurality of oversampling rate to one multiplexers is operably coupled to select an equivalent data value from a corresponding one of the plurality of streams of oversampled data based on the pointer variable.

21. The receiver of claim 17, wherein the staging register module comprises:

a plurality of first multiplexer structures operably coupled to produce each of the offset data word from a corresponding one of the equivalent data words;

a first plurality of multiplexers operably coupled to select a bit value for each of the equivalent data words based on an add bit control signal; and a plurality of history registers for storing the bit values as the extra words.

22. The receiver of claim 17, wherein the output register module comprises:

a plurality of multiplexers operably coupled to select a bit value from one of the corresponding offset data words or one of the corresponding extra data words based on a select control value;

a plurality of interim registers for storing corresponding ones of the bit values; and an output register operably coupled to the plurality of interim registers to retrieve data from the plurality of interim registers at a rate of the receive clock and output parallel data output at rate of a data output clock.

* * * * *